United States Patent
Gomes et al.

(10) Patent No.: US 10,184,692 B2
(45) Date of Patent: *Jan. 22, 2019

(54) ROBUST FIXED-SEQUENCE CONTROL METHOD AND APPLIANCE FOR EXCEPTIONAL TEMPERATURE STABILITY

(71) Applicant: WHIRLPOOL CORPORATION, Benton Harbor, MI (US)

(72) Inventors: Alberto R. Gomes, Saint Joseph, MI (US); Andrew D. Litch, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/348,243

(22) Filed: Nov. 10, 2016

(65) Prior Publication Data

US 2017/0059210 A1 Mar. 2, 2017

Related U.S. Application Data

(63) Continuation of application No. 13/836,130, filed on Mar. 15, 2013, now Pat. No. 9,528,727.

(51) Int. Cl.
*F25B 5/02* (2006.01)
*F25B 49/02* (2006.01)

(52) U.S. Cl.
CPC .............. *F25B 5/02* (2013.01); *F25B 49/022* (2013.01); *F25B 49/027* (2013.01);
(Continued)

(58) Field of Classification Search
CPC ........ F25B 5/02; F25B 49/022; F25B 49/027; F25B 2500/19; F25B 2600/01;
(Continued)

(56) References Cited

U.S. PATENT DOCUMENTS 8,161,763 B2 4/2012 Yun et al.
9,086,233 B2 7/2015 Chun et al.
(Continued)

FOREIGN PATENT DOCUMENTS

| EP | 1398584 | 6/2009 |
|---|---|---|
| JP | 2010121849 | 6/2010 |
| WO | 2009061030 | 5/2009 |

*Primary Examiner* — Marc Norman
(74) *Attorney, Agent, or Firm* — Price Heneveld LLP

(57) ABSTRACT

A method to control a fixed-sequence dual evaporator cooling system including providing a recurring cooling cycle cooling system wherein each recurring cooling cycle comprises first and second cooling cycles for cooling respective first and second interiors, a pump-out cycle for returning coolant to a condenser, and an idle cycle, and providing a processor to establish exceptions to the recurring cooling cycle. A step includes the processor monitoring first and second actual temperatures of the respective first and second interiors, selecting predetermined first and second control temperatures for the respective first and second interiors, and selecting a command input signal to supply to a compressor, the condenser fan, the first and second evaporator fans, and the valve of the cooling system during the recurring cooling cycle based upon the first and second actual temperatures and the predetermined first and second control temperatures to initiate the established exceptions.

20 Claims, 6 Drawing Sheets

(52) U.S. Cl.
CPC ....... *F25B 2500/19* (2013.01); *F25B 2600/01* (2013.01); *F25B 2600/0251* (2013.01); *F25B 2600/111* (2013.01); *F25B 2600/112* (2013.01); *F25B 2700/151* (2013.01); *F25B 2700/2104* (2013.01); *Y02B 30/743* (2013.01); *Y02B 40/32* (2013.01)

(58) Field of Classification Search
CPC ........ F25B 2600/0251; F25B 2600/111; F25B 2600/112; F25B 2700/151; F25B 2700/2104; F25D 11/022; Y02B 30/743; Y02B 40/32
See application file for complete search history.

(56) References Cited

U.S. PATENT DOCUMENTS

| | | |
|---|---|---|
| 9,528,727 B2 * | 12/2016 | Gomes ................. F25B 49/022 |
| 2005/0167081 A1 | 8/2005 | Park et al. |
| 2006/0236707 A1 | 10/2006 | Hong |
| 2009/0064710 A1 | 3/2009 | Kaga et al. |
| 2013/0061620 A1 | 3/2013 | Li |

\* cited by examiner

ROBUST FIXED-SEQUENCE CONTROL METHOD AND APPLIANCE FOR EXCEPTIONAL TEMPERATURE STABILITY

CROSS-REFERENCE TO RELATED APPLICATIONS

The present application is a continuation of U.S. patent application Ser. No. 13/836,130, filed Mar. 15, 2013, entitled ROBUST FIXED-SEQUENCE CONTROL METHOD AND APPLIANCE FOR EXCEPTIONAL TEMPERATURE STABILITY, which is related to U.S. patent application Ser. No. 13/833,577, filed Mar. 15, 2013, entitled NET HEAT LOAD COMPENSATION CONTROL METHOD AND APPLIANCE FOR TEMPERATURE STABILITY, the disclosures of which are incorporated herein by reference in their entireties.

FIELD OF THE INVENTION

The present invention generally relates to a sequential dual-evaporator appliance, typically a refrigerator or a freezer or a refrigerator and freezer, and more particularly relates to a particular method for controlling the sequential dual-evaporator appliance refrigerator.

SUMMARY

In one aspect, a method for robust fixed-sequence control of a dual evaporator cooling system includes the steps of providing a cooling system having a compressor, condenser fan, first and second evaporator fans, and a valve operating in a recurring fixed-sequence cooling cycle wherein each recurring fixed-sequence cooling cycle comprises a first cooling cycle for cooling a first interior, a second cooling cycle for cooling a second interior, a pump-out cycle for returning a coolant to the condenser, and an idle cycle and providing a processor for regulating the operation of the compressor, the condenser fan, the first and second evaporator fans, and the valve to establish exceptions to the recurring fixed-sequence cooling cycle. As part of the method, the processor performs the steps of monitoring a first actual temperature of the first interior, monitoring a second actual temperature of the second interior, selecting a predetermined first control temperature for the first interior, selecting a predetermined second control temperature for the second interior, and selecting a command input signal to supply to the compressor, the condenser fan, the first and second evaporator fans, and the valve during the recurring fixed-sequence cooling cycle based upon the first and second actual temperatures and the predetermined first and second control temperatures to initiate the established exceptions.

In another aspect, a method for robust fixed-sequence control of a dual evaporator cooling system comprising the steps of providing a cooling system having a compressor, condenser fan, first and second evaporator fans, and a valve operating in any one of a plurality a recurring fixed-sequence cooling cycles wherein each of the plurality of recurring fixed-sequence cooling cycles comprises a first cooling cycle for cooling a first interior, a second cooling cycle for cooling a second interior, a pump-out cycle for returning a coolant to the condenser, and an idle cycle and providing a processor for regulating the operation of the compressor, the condenser fan, the first and second evaporator fans and the valve to establish exceptions to each of the plurality of recurring fixed-sequence cooling cycles. As part of the method, the processor performs the steps of monitoring a first actual temperature of the first interior, monitoring a second actual temperature of the second interior, selecting a predetermined first control temperature for the first interior, selecting a predetermined second control temperature for the second interior, and selecting a command input signal to supply to the compressor, the condenser fan, the first and second evaporator fans, and the valve during each of the plurality of recurring fixed-sequence cooling cycles based upon the first and second actual temperatures and the predetermined first and second control temperatures to initiate the established exceptions.

In yet another aspect, a dual evaporator refrigerator having a robust fixed-sequence control, wherein the refrigerator includes a compressor, a condenser fan, first and second evaporator fans, a valve, a first interior, a second interior, and a processor configured for operating in any one of a plurality of recurring fixed-sequence cooling cycles wherein each of the plurality of recurring fixed-sequence cooling cycles comprises a first cooling cycle for cooling the first interior, a second cooling cycle for cooling the second interior, a pump-out cycle for returning a coolant to the condenser, and an idle cycle. The processer is further configured to regulate the operation of the compressor, the condenser fan, the first and second evaporator fans, and the valve to establish exceptions to each of the plurality of recurring fixed-sequence cooling cycles, monitor a first actual temperature of the first interior, monitor a second actual temperature of the second interior, select a predetermined first control temperature for the first interior, select a predetermined second control temperature for the second interior, and select a command input signal to supply to the compressor, the condenser fan, the first and second evaporator fans, and the valve during each of the plurality of recurring fixed-sequence cooling cycles based upon the first and second actual temperatures and the predetermined first and second control temperatures to initiate the established exceptions.

These and other features, advantages, and objects of the present device will be further understood and appreciated by those skilled in the art upon studying the following specification, claims, and appended drawings.

DETAILED DESCRIPTION OF EMBODIMENTS

It is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
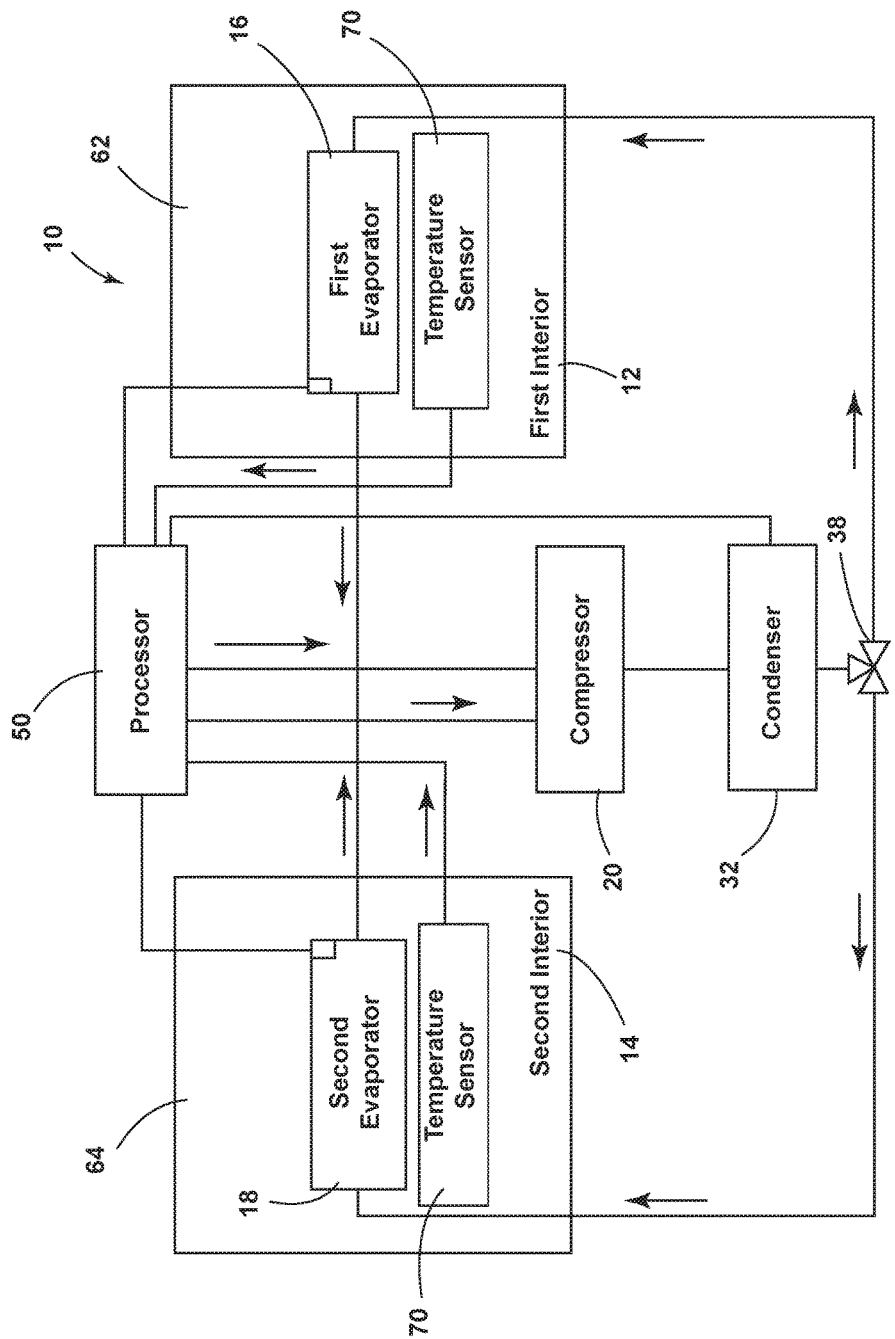
FIG. 1 is a schematic view of one embodiment of a refrigerator including one embodiment of the robust fixed-sequence control method.
Figure 2:
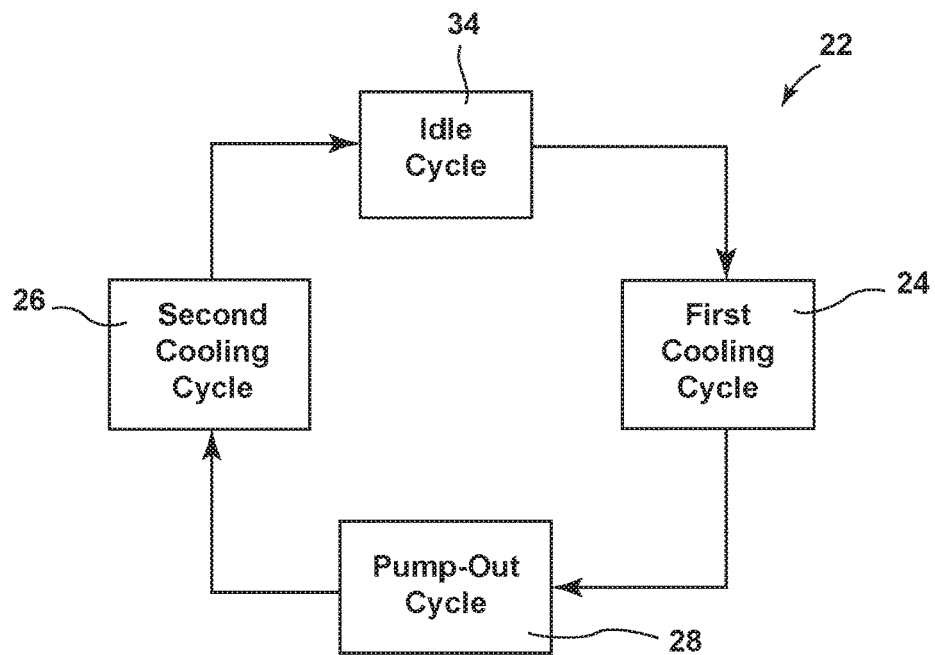
FIG. 2 is a schematic view of one embodiment of a recurring fixed-sequence cooling cycle.

With respect to FIGS. 1-2, a schematic representation of a refrigerator 10 is generally shown. The refrigerator 10 shown is a dual evaporator refrigerator 10 that includes a first interior 12 and a second interior 14 as well as first and second evaporators for the respective first 12 and second 14 interiors. The first interior 12 is typically a fresh food compartment and the second interior is typically a frozen food compartment, but conceivably both interiors could be fresh food compartments or both freezer compartments. The refrigerator 10 also includes a compressor that provides cooling to the first interior 12 and the second interior 14 by providing varying degrees of cooling to the first evaporator 16 and the second evaporator 18. Cooling is supplied to the evaporator in a recurring fixed-sequence cooling cycle that includes a first cooling cycle for cooling a first interior 12, a second cooling cycle 26 for cooling a second interior 14, a pump-out cycle 28 for returning a coolant 30 to a condenser 32, and an idle cycle 34. In this manner, the recurring fixed-sequence cooling cycle provides a command input signal 36 (shown in FIG. 4) to various aspects of the refrigerator 10 that can include, but are not limited to, the compressor, a condenser fan, first and second evaporator fans and a valve 38, which is typically a three-way valve. The command input signal 36 is an instruction to various aspects of the refrigerator regarding an exception to the recurring fixed-sequence cooling cycle 22, wherein the refrigerator performs a function outside of the regular pattern of the recurring fixed-sequence cooling cycle 22.

Figure 3:
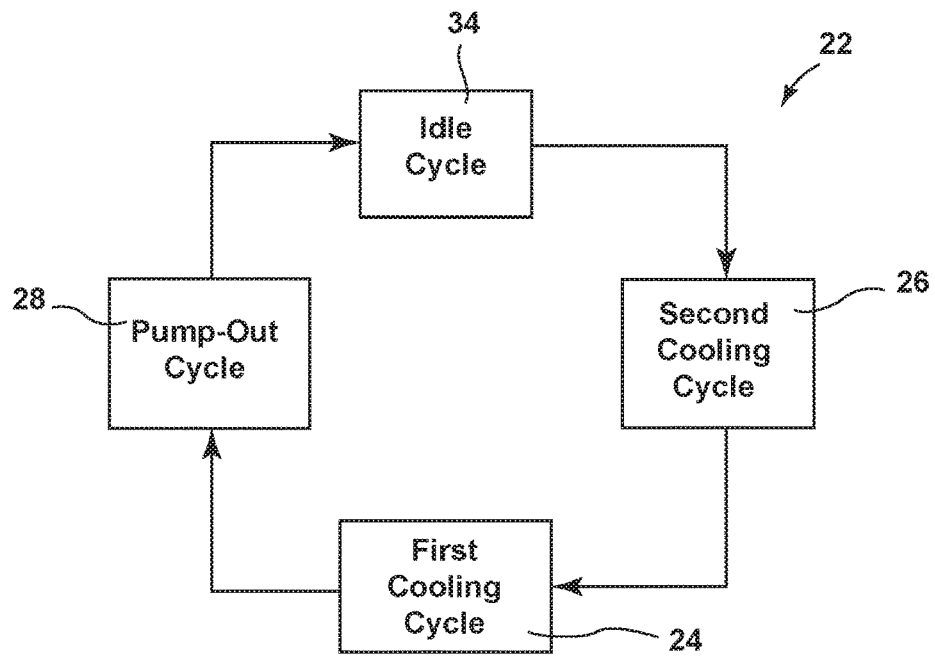
FIG. 3 is a schematic view of another embodiment of a recurring fixed-sequence cooling cycle.

In various embodiments, as illustrated in FIGS. 2-3, the recurring fixed-sequence cooling cycle 22 can include additional cycles or modes as well as varying orders of the cycles or modes within the recurring fixed-sequence cooling cycle. These varying cycles and modes can be selected based upon the design needs of the refrigerator 10 that implements the recurring fixed-sequence cooling cycle 22.

A processor disposed within the refrigerator 10 regulates the recurring fixed-sequence cooling cycle to control the operation of the compressor 20, the condenser fan, the first and second evaporator fans, and the valve. In this manner, the processor is configured to establish various exceptions to the recurring fixed-sequence cooling cycle in order to provide stable cooling within the refrigerator 10 under varying circumstances and conditions that are not efficiently handled or accounted for by the recurring fixed-sequence cooling cycle.

Having generally described the structure of the refrigerator 10, a method for robust fixed-sequence control in an appliance cooling system is now described. As illustrated in FIGS. 4-9, the robust fixed-sequence control method is generally executed by the processor, which executes an algorithm in order to control the command input signal 36 provided by the processor to the various aspects of the refrigerator 10.

As illustrated in FIGS. 1-4A, the method 500 includes step 502 whereby the processor monitors a first actual temperature 62 of the first interior 12, and a second actual temperature 64 of the second interior 14. In step 504 of the method 500, a predetermined first control temperature for the first interior 12 is selected, and a predetermined second control temperature for the second interior 14 is also selected. The selection of the predetermined first and second control temperatures can be accomplished by a user of a refrigerator 10, or automatically by the processor, taking into account various conditions present within the refrigerator 10 and conceivably ambient conditions around the refrigerator, typically via one or more exterior temperature sensors. The processor is also configured to select the command input signal 36 to supply to the compressor 20, the condenser fan, the first and second evaporator fans, and the valve during the recurring fixed-sequence cooling cycle based upon the first and second actual temperatures and the predetermined first and second control temperatures.

In order to monitor the first and second actual temperatures of the respective first 12 and second 14 interiors, first and second temperature sensors 70 can be included within the respective first 12 and second 14 interiors. The processor can use these temperature sensors 70 to periodically monitor the first and second actual temperatures. The processor can make temperature measurements of the first 12 and second 14 interiors continuously to provide real time data as to the first and second actual temperatures of the first 12 and second 14 interiors. Alternatively, the processor can take measurements over regular intervals, typically an interval between about 10 seconds and about 120 seconds. The regular intervals can include, but are not limited to: every 10 seconds, 30 seconds, 60 seconds, 120 seconds or other regular interval, so long as the interval is substantially short enough to provide substantially accurate information regarding the status of the refrigerator 10 and the first 12 and second 14 interiors.

Figure 4:
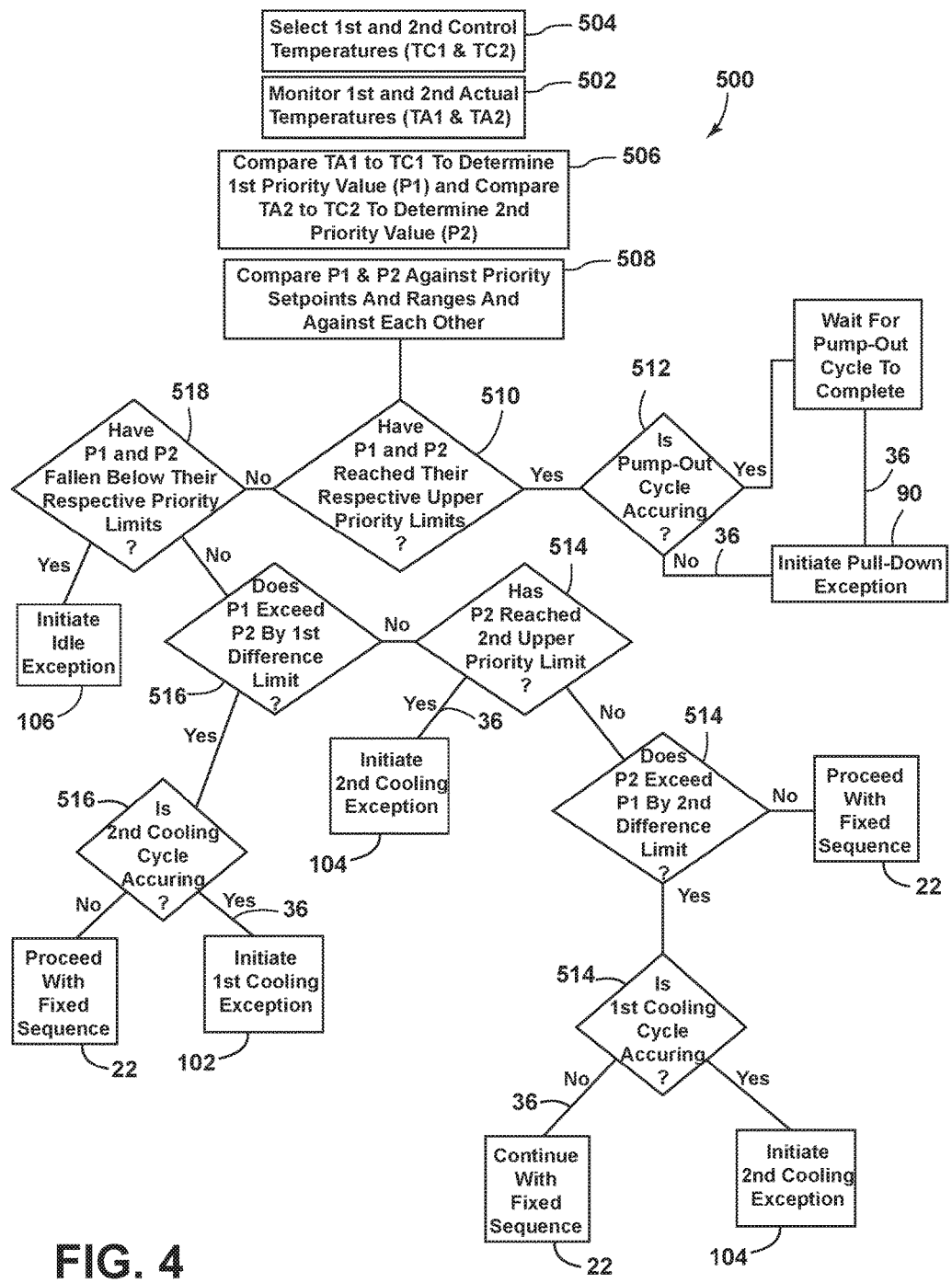
FIG. 4 is a schematic flow chart diagram of one embodiment of the robust fixed-sequence control method.
Figure 4A:
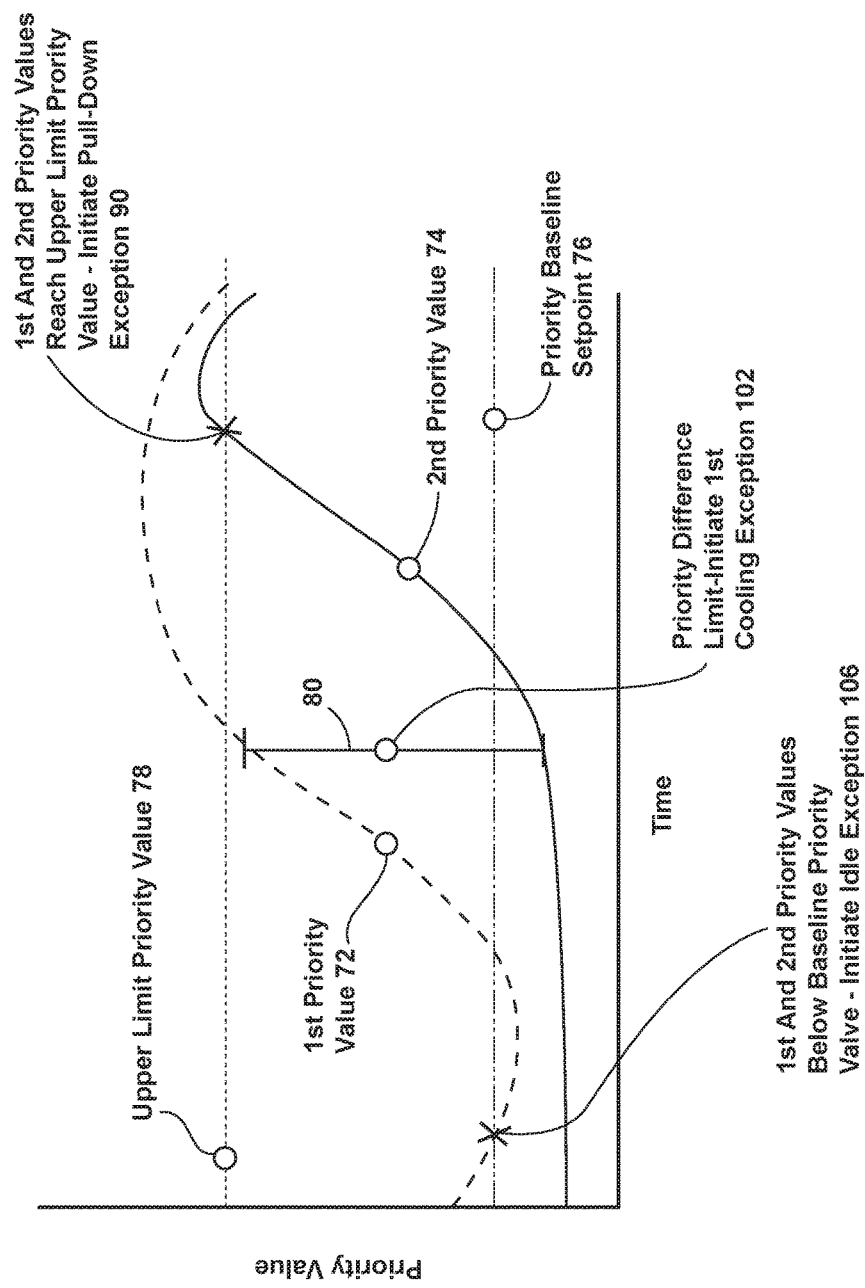
FIG. 4A is a schematic diagram of one embodiment of the robust fixed-sequence control method in use.

As illustrated in FIGS. 4 and 4A, the method 500 also includes step 506, whereby the processor is further configured to compare the first actual temperature 62 to a predetermined first control temperature in order to determine a first temperature difference. In addition, the processor 50 is configured to compare the first temperature difference to a set of predetermined first temperature parameters, wherein the processor 50 uses this comparison to arrive at a first priority value 72. The processor 50 is further configured to compare the second actual temperature to the predetermined second control temperature to arrive at a second temperature difference and compare the second temperature difference to a set of predetermined second temperature parameters in order to arrive at a second priority value 74. In the various embodiments, the greater the difference between the actual temperatures and the predetermined control temperatures, the greater the priority value will be. In this manner, small differences will typically be assigned substantially low priority values and larger differences will typically be assigned substantially higher priority values. The processor 50, according to step 508, compares these priority values against various priority setpoints and ranges in order to determine whether an exception needs to be initiated. These setpoints can include a priority baseline setpoint 76, wherein the value of the priority baseline setpoint 76 is low to indicate when the difference between the actual and predetermined control temperatures is a substantially small value. An upper priority limit can also be included, wherein the value of the upper priority limit 78 is high to indicate when the difference between the actual and predetermined control temperatures is a substantially high value. In addition, comparative parameters can be included, wherein the first priority value 72 and the second priority value 74 are compared and exceptions can be initiated when the difference between the priority values is outside of certain parameters or exceeds a comparative parameter limit 80. The comparative parameter limit 80 can be determined by comparing the first priority value 72 and the second priority value 74 through the use of a mathematical function. The mathematical function can include, but is not limited to, subtraction, a percentage calculation, or other comparative mathematical function.

In various embodiments, the processor 50 selects a command input signal 36 based upon the first 72 and second 74 priority values. In various other embodiments, the processor can be configured to account for a lag time or delay, between when a command input signal 36 is provided to when the results of the command input cycle are actually realized within the first 12 and second 14 interiors of the refrigerator 10. In this manner, when the processor 50 selects the command input signal 36 based upon the first 72 and second 74 priority values, the processor 50 can include first and second hysteresis values to the respective first and second temperature differences, in order to account for the above-described lag time or delay.

As discussed above, the processor 50 uses the first 72 and second 74 priority values in order to determine when an exception to the recurring fixed-sequence cooling cycle needs to be instituted to account for varying conditions within and around the refrigerator. The first 72 and second 74 priority values can be evaluated individually or compared in order to determine if an exception needs to be initiated. As discussed above, the recurring fixed-sequence cooling cycle can include many different variations and combinations of subcycles within the recurring fixed-sequence cooling cycle. In addition, in various embodiments, the refrigerator 10 can be configured to alter the recurring fixed-sequence cooling cycle after purchase in order to account for substantially long-term changes in conditions present within or around the refrigerator, such changes can include, but are not limited to, changing uses of the refrigerator, changing locations of the refrigerator, relocation of the refrigerator 10 to differing climates or altitudes, and other such long term changes.

Figure 5:
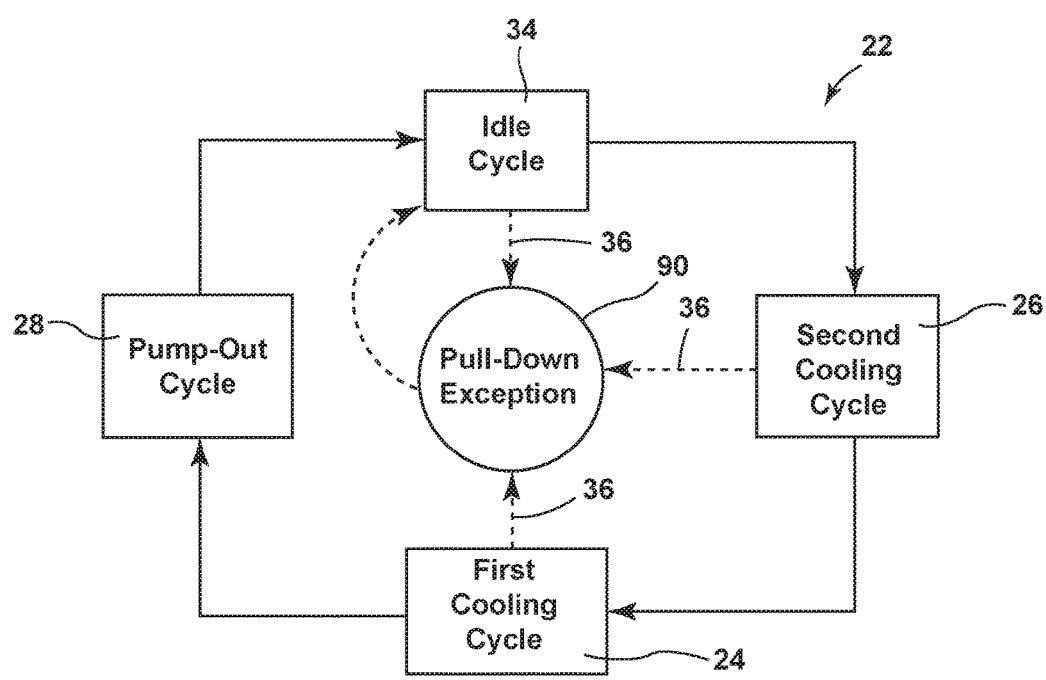
FIG. 5 is a schematic view of the recurring fixed-sequence cooling cycle of FIG. 4 with the pull-down exception being implemented.

Referring again to the embodiment as illustrated in FIGS. 4 and 5, the processor 50 is further configured to select the command input signal 36 to initiate a pull-down exception 90 that provides alternating cooling between the first 12 and second 14 interiors, wherein the alternating cooling is provided outside of the recurring fixed-sequence cooling cycle. According to step 510 of the method 500, the processor 50 is configured to initiate the pull-down exception 90 when the first priority value 72 for the first interior 12 reaches the predetermined upper priority limit and the second priority value 74 for the second interior 14 also reaches the predetermined upper priority limit. In various embodiments, each interior can be assigned separate upper priority limits. The pull-down exception 90 described above is typically initiated when the first and second compartments include substantially warm temperatures including temperatures that are the same as or about the same as the ambient temperature of the environment surrounding the appliance (refrigerator). Situations where the pull-down exception 90 can be initiated include, but are not limited to, when the refrigerator 10 is first turned on, after doors of the refrigerator 10 have been opened for an extended period of time, after the refrigerator 10 has been idle for an extended period of time, and other conditions that will result in the first and second compartments having substantially higher first and second actual temperatures than the set point temperatures for each compartment.

Figure 6:
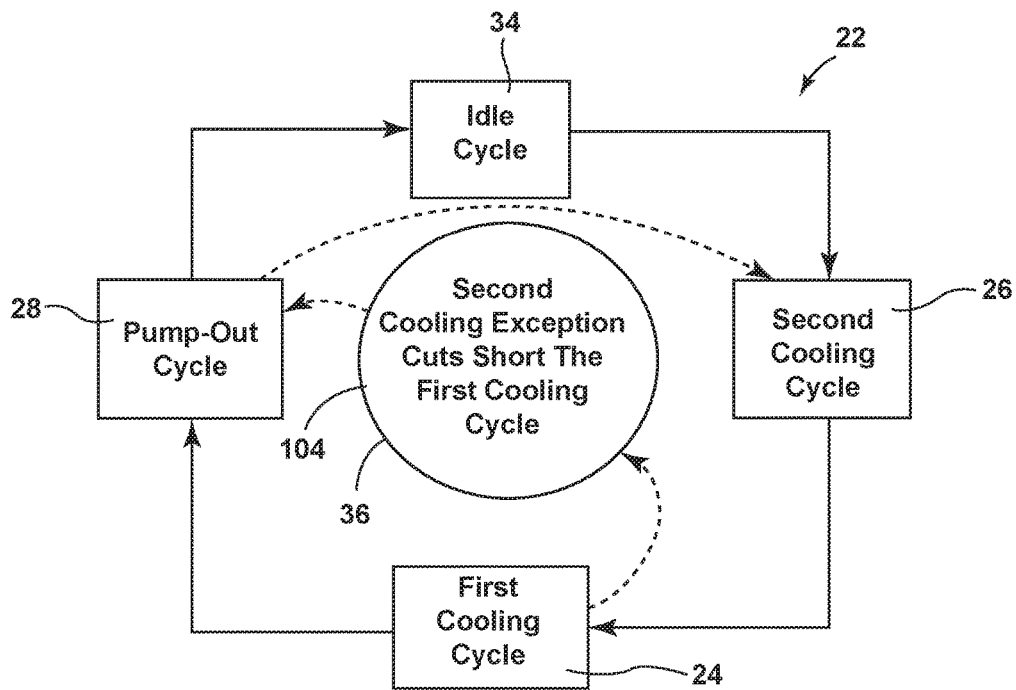
FIG. 6 is a schematic view of the recurring fixed-sequence cooling cycle of FIG. 4 with the second cooling exception being implemented.

As illustrated in FIGS. 4 and 6, according to step 512 of the method 500, the processor 50 can be further configured to select the command input signal 36 to initiate a pump-out exception 100, wherein the coolant 30 is returned to the condenser 32, such that a first 102 or second 104 interior cooling exception can be initiated outside of the recurring fixed-sequence cooling cycle. Typically, the pump-out exception 100 is included as part of the second cooling exception 104, wherein before the second cooling exception 104 occurs, the pump-out exception 100 occurs in preparation for the second cooling exception 104. In addition, the pump-out exception 100 will not be initiated during the operation of a pull-down exception 90, as described above. The processor 50 will initiate a pump-out exception 100 when the second priority value 74 exceeds a first priority value 72 by the predetermined comparative parameter limit 80, or, when the second priority value 74 reaches the predetermined upper priority limit. During the pump-out exception 100, coolant fluid is moved from the evaporator to the condenser 32, wherein the condenser 32 operates to lower the temperature of the coolant 30 such that the coolant 30 can be transferred to the second evaporator so that cooling stored within the coolant 30 can be transferred through the evaporator and into the second compartment. The pump-out exception 100 can be initiated when a substantially exceptional heat load has been applied to the second compartment, such that the second actual temperature of the second interior 14 substantially increases to achieve the necessary parameters required to initiate the pump-out exception 100. Conditions that can result in initiating the pump-out exception 100 can include, but are not limited to, leaving the door of the second interior 14 open for an extended period of time, or placing an item having an exceptionally high temperature within the second interior 14.

As illustrated in FIGS. 4 and 6, according to step 514 of the method, the processor 50 is further configured to select command signals to initiate the second interior cooling exception 104 to interrupt a regular first interior 12 cooling cycle of the recurring fixed-sequence cooling cycle. When the first 72 and second 74 priority values are present to initiate the pull-down exception 90, the second interior cooling exception 104 is not initiated. The processor 50 will provide a command input signal 36 to initiate a second interior cooling exception 104 when the second priority value 74 reaches the predetermined upper priority limit, or when the second priority value 74 exceeds the first priority value 72 by the predetermined comparative parameter limit 80. Similar to the pump-out exception 100, the second interior cooling exception 104 will be initiated when the second interior 14 achieves an actual temperature well above the predetermined second control temperature, under various conditions, as described above.

As illustrated in FIG. 4, the method also includes step 516, wherein the processor 50 can be further configured to select a command input signal 36 to initiate the first interior cooling exception 102 during a regular second interior cooling cycle 26 of the recurring fixed-sequence cooling cycle. The processor 50 will select the command input signal 36 to initiate the first interior cooling exception 102 when the first priority value 72 exceeds the second priority value 74 by the predetermined comparative parameter limit 80. However, the first interior cooling exception 102 will not be initiated where the first 72 and second 74 priority values have both reached the predetermined upper priority limit such that the pull-down exception 90 will be initiated instead. Similar to the second interior cooling exception 104 and the pump-out exception 100, conditions of the refrigerator 10 that can initiate the first interior 12 cooling exception can include, but are not limited to, leaving the door of the first interior 12 open for an extended period of time, or placing an item with a substantially warm temperature within the first interior 12.

As illustrated in FIG. 4, the method also includes step 518, wherein the processor 50 can be configured to select the command input signal 36 to initiate an idle exception 106, wherein the compressor 20 and the condenser fan are deactivated in a manner outside of the recurring fixed-sequence cooling cycle. The processor 50 will supply a command input signal 36 to initiate the idle exception 106 when the first priority value 72 falls below the predetermined priority baseline setpoint 76 and the second priority value 74 also falls below the predetermined priority baseline setpoint 76. The idle exception 106 will also be initiated when the second interior cooling cycle 26, whether part of the recurring fixed-sequence cooling cycle or part of the second interior cooling exception 104, is delayed due to the operation of a defrost cycle that was initiated before the second interior cooling exception 104 or cycle was to be initiated. Under these conditions, the initiation of the second interior cooling cycle 104 or exception will begin after the completion of the current defrost cycle. As with the upper priority limits 78, each interior can be assigned a separate priority baseline setpoints and/or a separate comparative parameter limit 80.

Figure 7:
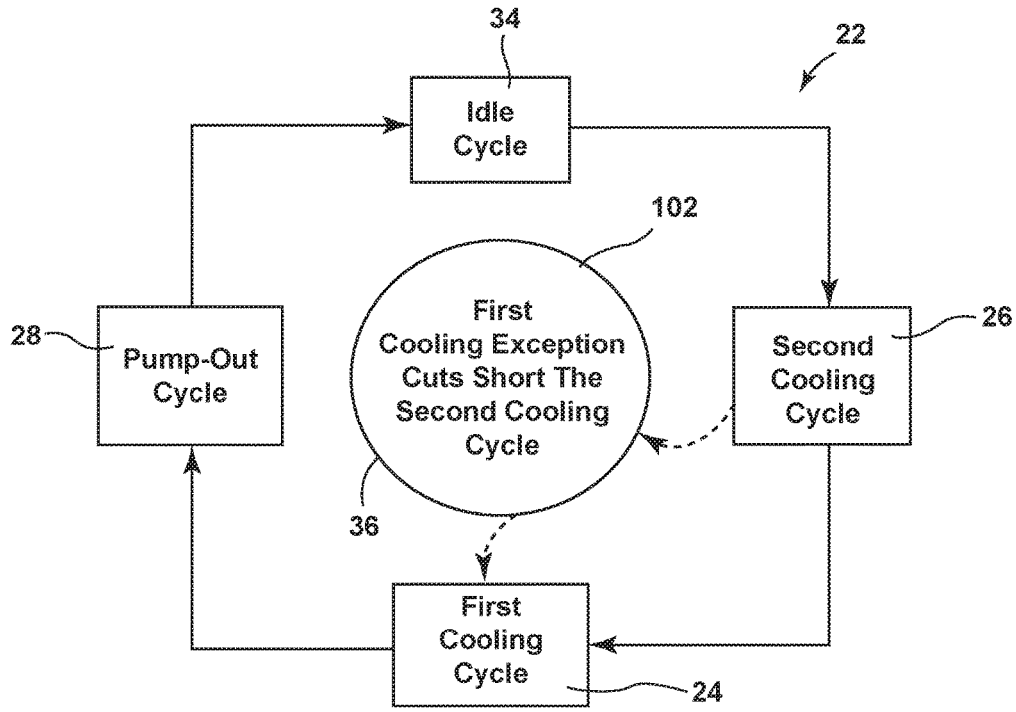
FIG. 7 is a schematic view of the recurring fixed-sequence cooling cycle of FIG. 4 with the first cooling exception being implemented.

As illustrated in FIGS. 4 and 7, in certain recurring fixed-sequence cooling cycles where the second interior cooling cycle 26 does not follow immediately after the pump-out cycle 28, the processor 50 can select a command input signal 36 to initiate the second interior cooling exception 104 immediately after the pump-out cycle 28 inconsistent with a particular recurring fixed-sequence cooling cycle. The second interior cooling exception 104 will be initiated after the pump-out cycle 28 when the second priority value 74 reaches the predetermined upper priority limit 78, or when the second priority value 74 exceeds the first priority value 72 by a predetermined comparative parameter limit 80.

The exceptions discussed above are typically implemented to address exceptional, unexpected, or emergency situations that the recurring fixed-sequence cooling cycle is not necessarily equipped to efficiently respond to. Additional exceptions can be configured within the processor 50 to address a wide range of these exceptional circumstances. Other exceptions can include, but are not limited to, an evaporator fan exception for turning on the second evaporator fan outside of the recurring fixed-sequence cooling cycle to provide emergency cooling to the second interior 14 even when the conditions for instituting the pull-down exception 90 or the second interior cooling exception 104 are not present. A variable cooling compressor exception can be included wherein the frequency of the compressor 20 is increased or decreased to provide more or less cooling to the refrigerator 10 under varying circumstances. A sensor error exception can also be included, wherein the sensor error exception is initiated when the temperature sensors 70 within the first interior 12, the second interior 14, or both, are not functioning properly. The sensor error exception, instead of providing cooling for a sufficient period of time to decrease the temperature within the first 12 or second 14 interior to the predetermined first or second control temperatures, provides cooling for a predetermined period of time. The sensor error exception will continue to operate to provide cooling in the first 12 or second 14 interiors, or both, until such time as the temperature sensors 70 are functional. Additional exceptions can be configured within the processor 50 and the refrigerator 10 to respond to exceptional conditions present within and around the refrigerator 10. In addition, one exception can operate to interrupt another exception.

Referring again to FIGS. 1-4A, one aspect of the robust fixed-sequence control includes the refrigerator 10 as generally described above. In one embodiment, the refrigerator 10 contains first 12 and second 14 interiors and a cooling system comprising the compressor 20, the condenser fan, the first and second evaporator fans, and the valve 38, configured to provide cooling to the first 12 and second 14 interiors. The refrigerator 10 also includes a processor 50 that is configured for operating in any one of a plurality of recurring fixed-sequence cooling cycles, wherein each of the plurality of recurring fixed-sequence cooling cycles comprises the first cooling cycle 24 for cooling the first interior 12, the second cooling cycle 26 for cooling the second interior 14, the pump-out cycle 28 for returning coolant 30 to the condenser 32, and an idle cycle 34.

The processor 50 operates the recurring fixed-sequence cooling cycle and initiates exceptions thereto by monitoring first and second actual temperatures of the first and second interiors 14, respectively, using one or more temperature sensors in thermal communication with and typically physically positioned within the interior. Predetermined first and second control temperatures for the respective first 12 and second interiors 14 are selected. The processor 50 is further configured to select a command input signal 36 to supply to the compressor 20, the condenser fan, the first and second evaporator fans, and the valve during each of the plurality of recurring fixed-sequence cooling cycles based on the first and second actual temperatures and the predetermined first and second control temperatures.

The processor 50 of the refrigerator 10 is further configured to compare the first actual temperature 62 to the predetermined first control temperature to determine a first temperature difference, and compare the first temperature difference to a set of predetermined first temperature difference ranges to arrive at a first priority value 72. In addition, the processor 50 is further configured to compare the second actual temperature 64 to the predetermined second control temperature to determine a second temperature difference and compare the second temperature difference to a set of predetermined second temperature difference ranges to arrive at a second priority value 74. The processor 50 then selects a command input signal 36 based upon the first 72 and second 74 priority values. Various exceptions to the plurality of recurring fixed-sequence cooling cycles, as discussed above, can be included in the processor 50 of the refrigerator 10.

In various embodiments, additional compartments and interiors can be included that have separate temperature sensors 70, wherein the processor 50 operates to assign priority values and select and supply separate command input signals 36 to the other interiors. The interiors can include, but are not limited to, an ice box, a pantry, or other such compartment. Moreover, in various embodiments, a variable speed compressor or a fixed speed compressor can be used to deliver cooling during the recurring fixed-sequence cooling cycle and exceptions thereto.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for fixed-sequence control of a dual evaporator cooling system comprising steps of:
   operating said dual evaporator cooling system in a recurring fixed-sequence cooling cycle wherein each recurring fixed-sequence cooling cycle includes at least a first cooling cycle for cooling a first interior and a second cooling cycle for cooling a second interior;
   establishing exceptions to the recurring fixed-sequence cooling cycle, wherein a processor establishes the exceptions;
   monitoring first and second actual temperatures of the first and second interiors, respectively;
   selecting predetermined first and second control temperatures for the first and second interiors, respectively; and
   selecting a command input signal to supply to said dual evaporator cooling system during the recurring fixed-sequence cooling cycle based upon the first and second actual temperatures and the predetermined first and second control temperatures to initiate the established exceptions.

2. The method of claim 1, further comprising the step of:
   comparing the first actual temperature to the predetermined first control temperature to determine a first temperature difference;
   comparing the first temperature difference to a set of predetermined first temperature difference ranges to determine a first priority value;
   comparing the second actual temperature to the predetermined second control temperature to determine a second temperature difference;
   comparing the second temperature difference to a set of predetermined second temperature difference ranges to determine a second priority value; and
   selecting the command input signal based upon the first and second priority values.

3. The method of claim 2, wherein the step of selecting the command input signal based upon the first and second priority values, includes addition of first and second hysteresis values to the first and second temperature differences, respectively.

4. The method of claim 2, wherein the step of establishing exceptions to the recurring fixed-sequence cooling cycle further comprises the steps of:
   selecting the command input signal to initiate a pull-down exception to provide alternating cooling between the first and second interiors outside of the recurring fixed-sequence cooling cycle when the first priority value reaches a predetermined upper priority limit and the second priority value reaches the predetermined upper priority limit;
   selecting the command input signal to initiate a second interior cooling exception during a current first interior cooling mode to provide cooling to the second interior outside of the recurring fixed-sequence cooling cycle when the pull-down exception has not been initiated and when:
      a. the second priority value reaches the predetermined upper priority limit; or
      b. the second priority value exceeds the first priority value by a predetermined comparative parameter limit; and
   selecting the command input signal to initiate a first interior cooling exception during a current second interior cooling mode to provide cooling to the first interior outside of the recurring fixed-sequence cooling cycle when the pull-down exception has not been initiated and when the first priority value exceeds the second priority value by the predetermined comparative parameter limit.

5. The method of claim 4, wherein the step of establishing exceptions to the recurring fixed-sequence cooling cycle further comprises the step of:

selecting the command input signal to initiate an idle exception wherein a compressor and a condenser fan are turned off outside of the recurring fixed-sequence cooling cycle when:
   a. the first priority value falls below a predetermined first priority baseline and the second priority value falls below a predetermined second priority baseline; or
   b. a second interior cooling cycle is delayed by a current defrost cycle that began before the second interior cooling cycle was to be initiated, wherein initiation of the second interior cooling cycle will begin after completion of the current defrost cycle.

6. The method of claim 5, wherein the recurring fixed-sequence cooling cycle includes a first fixed-sequence, wherein the method further comprises:
selecting the command input signal to initiate the second interior cooling exception to provide cooling to the second interior outside of the recurring fixed-sequence cooling cycle after a current pump-out cycle is complete and when:
   a. the second priority value reaches the predetermined upper priority limit; or
   b. the second priority value exceeds the first priority value by the predetermined comparative parameter limit.

7. A method for fixed-sequence control of a dual evaporator cooling system comprising the steps of:
operating said dual evaporator cooling system in any one of a plurality of recurring fixed-sequence cooling cycles wherein each of the plurality of recurring fixed-sequence cooling cycles comprises a plurality of cooling cycles, each cooling cycle adapted to cool a corresponding interior refrigerated compartment;
establishing exceptions to each of the plurality of recurring fixed-sequence cooling cycles, wherein a processor operates said dual evaporator cooling system and establishes the exceptions;
monitoring an actual temperature of each interior refrigerated compartment;
selecting a respective predetermined control temperature for each interior refrigerated compartment; and
selecting a command input signal to supply to said dual evaporator cooling system during each of the plurality of recurring fixed-sequence cooling cycles based upon the actual temperatures and the respective predetermined control temperatures of each interior refrigerated compartment to initiate the established exceptions.

8. The method of claim 7, further comprising the steps of:
comparing a first actual temperature of a first refrigerated interior to a predetermined first control temperature to determine a first temperature difference;
comparing the first temperature difference to a set of predetermined first temperature difference ranges to determine a first priority value;
comparing a second actual temperature of a second refrigerated interior to a predetermined second control temperature to determine a second temperature difference;
comparing the second temperature difference to a set of predetermined second temperature difference ranges to determine a second priority value; and
selecting the command input signal based upon the first and second priority values.

9. The method of claim 8, wherein the step of selecting the command input signal based upon the first and second priority values, includes addition of first and second hysteresis values to the first and second temperature differences, respectively.

10. The method of claim 8, wherein the step of establishing exceptions to any one of the plurality of recurring fixed-sequence cooling cycles further comprises the steps of:
selecting the command input signal to initiate a pull-down exception to provide alternating cooling between the first and second refrigerated interiors outside of any one of the plurality of recurring fixed-sequence cooling cycles when the first priority value reaches a predetermined upper priority limit and the second priority value reaches the predetermined upper priority limit.

11. The method of claim 10, wherein the step of establishing exceptions to any one of the plurality of recurring fixed-sequence cooling cycles further comprises the step of:
selecting the command input signal to initiate a second refrigerated interior cooling exception during a current first interior cooling mode to provide cooling to the second interior outside of any one of the plurality of recurring fixed-sequence cooling cycles when the pull-down exception has not been initiated and a current pump-out exception or cycle is completed and when:
   a. the second priority value reaches the predetermined upper priority limit; or
   b. the second priority value exceeds the first priority value by a predetermined comparative parameter limit; and
selecting the command input signal to initiate a first interior cooling exception during a current second interior cooling mode to provide cooling to the first refrigerated interior outside of the plurality of recurring fixed-sequence cooling cycles when the pull-down exception has not been initiated and when the first priority value exceeds the second priority value by the predetermined comparative parameter limit.

12. The method of claim 11, wherein the step of establishing exceptions to any one of the plurality of recurring fixed-sequence cooling cycles further comprises the step of:
selecting the command input signal to initiate an idle exception wherein a compressor and a condenser fan are turned off outside of the plurality of recurring fixed-sequence cooling cycles when:
   a. the first priority value falls below a predetermined first priority baseline and the second priority value falls below a predetermined second priority baseline; or
   b. a second interior cooling cycle is delayed by a current defrost cycle that began before the second interior cooling cycle was to be initiated, wherein initiation of the second interior cooling cycle will begin after completion of the current defrost cycle.

13. The method of claim 12, wherein the plurality of recurring fixed-sequence cooling cycles includes a first fixed-sequence, wherein the method further comprises the steps of:
selecting the command input signal to initiate the second interior cooling exception to provide cooling to the second refrigerated interior outside of the plurality of recurring fixed-sequence cooling cycles when the current pump-out cycle is complete and when:
   a. the second priority value reaches the predetermined upper priority limit; or
   b. the second priority value exceeds the first priority value by the predetermined comparative parameter limit.

14. A dual evaporator refrigerator having a fixed-sequence control, the refrigerator comprising:

a said dual evaporator cooling system that is selectively operated in any one of a plurality of recurring fixed-sequence cooling cycles, wherein each of the plurality of recurring fixed-sequence cooling cycles includes a first cooling cycle for cooling a first interior and a second cooling cycle for cooling the second interior; and a processor adapted to operate the plurality of recurring fixed-sequence cooling cycles, wherein the processor is further configured to:
  a. establish exceptions to each of the plurality of recurring fixed-sequence cooling cycles;
  b. monitor first and second actual temperatures of the first and second interiors, respectively;
  c. select predetermined first and second control temperatures for the first and second interiors, respectively; and
  d. select a command input signal to supply to the said dual evaporator cooling system during each of the plurality of recurring fixed-sequence cooling cycles based upon the first and second actual temperatures and the predetermined first and second control temperatures to initiate the established exceptions.

15. The dual evaporator refrigerator of claim 14, wherein the processor is further configured to:
  a. compare the first actual temperature to the predetermined first control temperature to determine a first temperature difference;
  b. compare the first temperature difference to a set of predetermined first temperature difference ranges to determine a first priority value;
  c. compare the second actual temperature to the predetermined second control temperature to determine a second temperature difference;
  d. compare the second temperature difference to a set of predetermined second temperature difference ranges to determine a second priority value; and
  e. select the command input signal based upon the first and second priority values.

16. The dual evaporator refrigerator of claim 15, wherein the processor is further configured to select the command input signal based upon the first and second priority values, wherein first and second hysteresis values are added to the respective first and second temperature differences.

17. The dual evaporator refrigerator of claim 15, wherein the processor is further configured to select the command input signal to initiate a pull-down exception to provide alternating cooling between the first and second interiors outside of any one of the plurality of recurring fixed-sequence cooling cycles when the first priority value reaches a predetermined upper priority limit and the second priority value reaches the predetermined upper priority limit.

18. The dual evaporator refrigerator of claim 17, wherein the processor is further configured to:
  a. select the command input signal to initiate a second interior cooling exception during a current first interior cooling mode to provide cooling to the second interior outside of any one of the plurality of recurring fixed-sequence cooling cycles when the pull-down exception has not been initiated and a current pump-out exception or cycle is completed and when:
    i. the second priority value reaches the predetermined upper priority limit; or
    ii. the second priority value exceeds the first priority value by a predetermined comparative parameter limit; and
  b. select the command input signal to initiate a first interior cooling exception during a current second interior cooling mode to provide cooling to the first interior outside of the plurality of recurring fixed-sequence cooling cycles when the pull-down exception has not been initiated and when the first priority value exceeds the second priority value by the predetermined comparative parameter limit.

19. The dual evaporator refrigerator of claim 18, wherein the processor is further configured to select the command input signal to initiate an idle exception wherein a compressor and a condenser fan are turned off outside of the plurality of recurring fixed-sequence cooling cycles when:
  a. the first priority value falls below a predetermined first priority baseline and the second priority value falls below a predetermined second priority baseline; or
  b. a second interior cooling cycle is delayed by a current defrost cycle that began before the second interior cooling cycle was to be initiated, wherein initiation of the second interior cooling cycle will begin after completion of the current defrost cycle.

20. The dual evaporator refrigerator of claim 19, wherein the processor is further configured to select the command input signal to initiate the second interior cooling exception to provide cooling to the second interior outside of at least one of the plurality of recurring fixed-sequence cooling cycles when the current pump-out cycle is complete and when:
  a. the second priority value reaches the predetermined upper priority limit; or
  b. the second priority value exceeds the first priority value by the predetermined comparative parameter limit.

* * * * *